United States Patent [19]

Nelson

[11] Patent Number: 4,869,346
[45] Date of Patent: Sep. 26, 1989

[54] AUTOMATIC CRANKCASE OIL CHANGE AND MAKEUP SYSTEM

[76] Inventor: Donald M. Nelson, 2142 Vuelta Ct., Carlsbad, Calif. 92008

[21] Appl. No.: 85,170

[22] Filed: Aug. 14, 1987

[51] Int. Cl.$^4$ ............................................. F01M 11/04
[52] U.S. Cl. .................................. 184/1.5; 123/196 S; 184/29; 184/103.1
[58] Field of Search .................. 123/196 S, 196 R; 184/1.5, 29, 39, 42, 103.1, 105.1

[56] References Cited

U.S. PATENT DOCUMENTS

| | | | |
|---|---|---|---|
| 2,836,259 | 5/1958 | Norton | 222/385 X |
| 3,447,636 | 6/1969 | Bonfilio | 123/196 R X |
| 3,481,318 | 12/1969 | Sparrow et al. | 184/29 X |
| 3,876,037 | 4/1975 | Rath, Jr. | 184/103.1 X |
| 3,882,967 | 5/1975 | Gulla et al. | 184/103.1 |
| 4,012,012 | 3/1977 | Ligler | 123/196 S X |
| 4,091,894 | 5/1978 | Lang | 184/103.1 |
| 4,091,895 | 5/1978 | Lang | 184/103.1 |
| 4,105,092 | 8/1978 | Zeidler et al. | 123/196 S X |
| 4,157,744 | 6/1979 | Capriotti | 123/196 S X |
| 4,299,307 | 11/1981 | Scott | 184/6.4 X |
| 4,417,561 | 11/1983 | Yasuhara | 123/196 R X |
| 4,421,078 | 12/1983 | Hurner | 123/196 R |
| 4,495,909 | 1/1985 | Hurner | 123/196 R |
| 4,632,080 | 12/1986 | Hurner | 123/196 S |
| 4,674,456 | 6/1987 | Merritt | 123/196 S |

FOREIGN PATENT DOCUMENTS 41410 4/1981 Japan .............................. 123/196 R Primary Examiner—Leonard E. Smith
Attorney, Agent, or Firm—Albert L. Gabriel

[57] ABSTRACT

Method and apparatus for automatically changing engine lubricating oil while the engine is running, in which small increments of used lubricating oil are periodically removed from the lubricating oil system, and substantially simultaneously with the removal of each increment of used oil, a corresponding increment of fresh oil is delivered to the lubricating oil system, so the volume of oil in the lubricating system is not reduced by the removal. Oil sump level sensing determines the destination of each used oil increment that is removed. If the sump level is not substantially below a predetermined satisfactory operating level when an increment of used oil is removed, the increment is delivered to the fuel tank for burnoff with the fuel for diesel engines, or to a holding tank for other engines, in a normal oil change mode of operation. If, however, the sump level is substantially below the predetermined level, then the increment is delivered back to the lubricating oil system in an oil makeup mode of operation. Actuation and timing of the apparatus are microprocessor or otherwise electronically controlled.

30 Claims, 3 Drawing Sheets

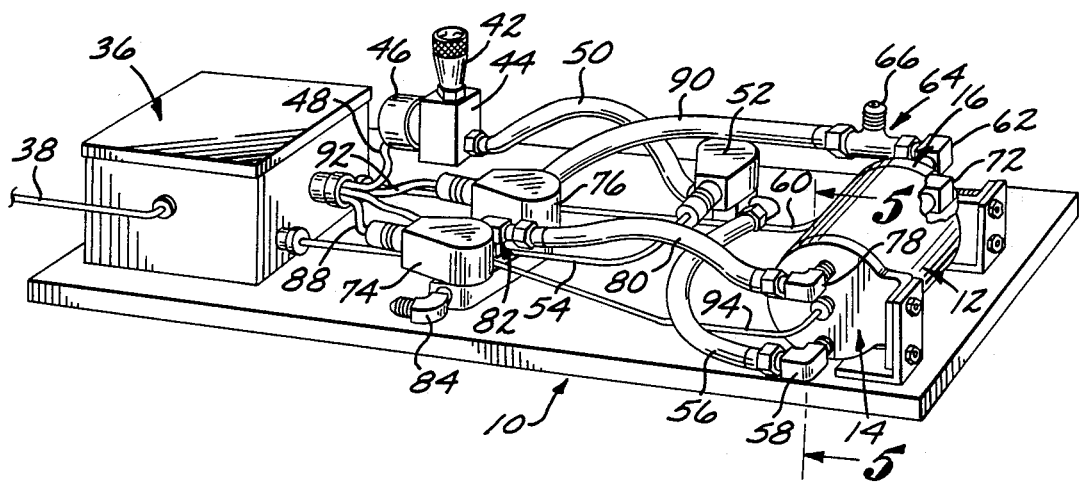

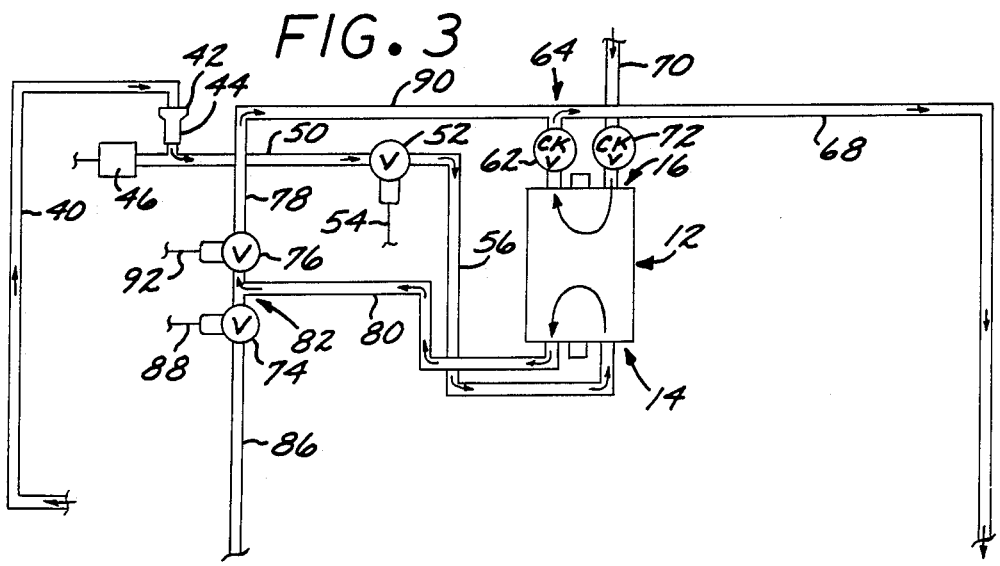
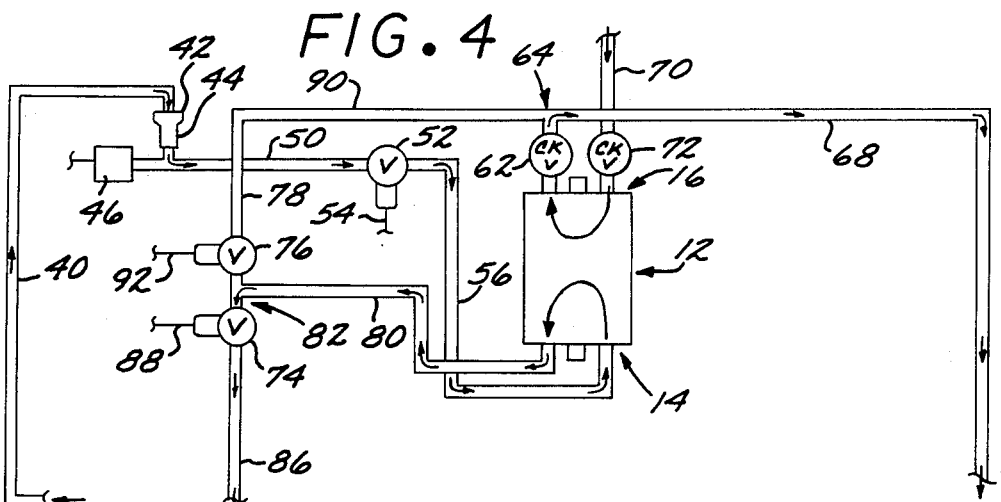
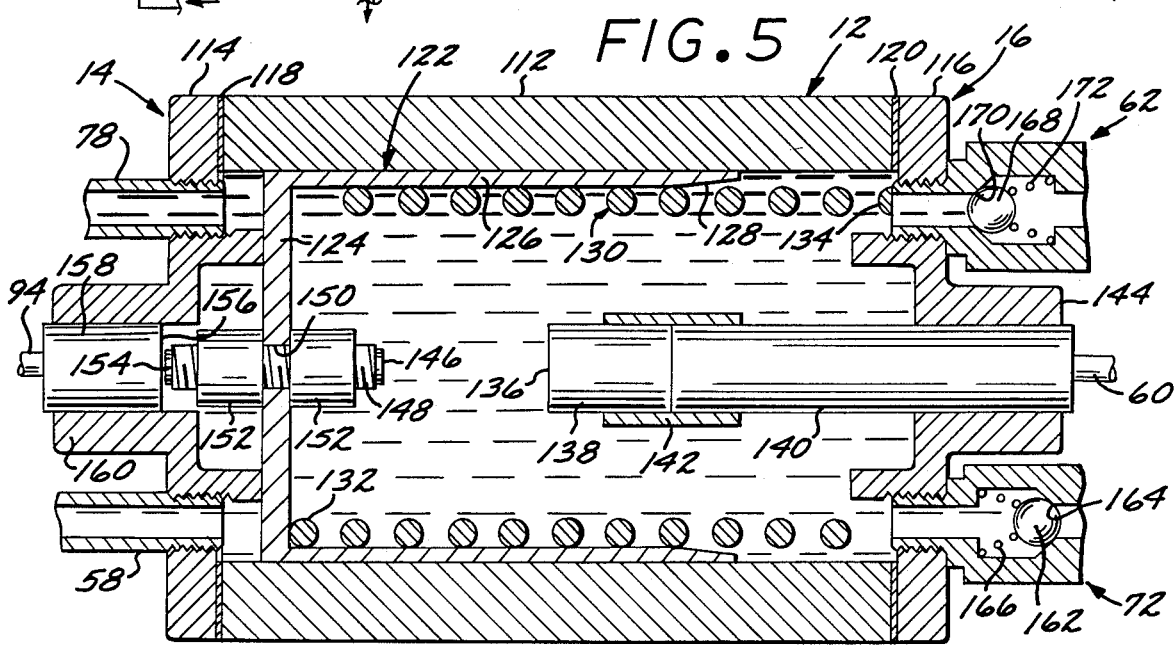

AUTOMATIC CRANKCASE OIL CHANGE AND MAKEUP SYSTEM

BACKGROUND OF THE INVENTION

1. Field of the Invention

The present invention is in the field of systems for automatically changing the crankcase oil of an internal combustion engine while the engine is operating, and for providing fresh makeup oil when a low crankcase oil level is sensed.

2. Description of the Prior Art

Systems have been known and used in the art for a number of years for automatically changing internal combustion engine crankcase oil during engine operation, with used crankcase oil being removed in small increments on a periodic basis controlled by a timer or other means, and with fresh makeup oil being supplied to replace the periodically removed used crankcase oil and also crankcase oil consumed by engine operation in response to the sensing of a low crankcase oil level by a sensor located in the crankcase. For diesel engines, it has been common to conduct the periodically removed used crankcase oil to the fuel tank, where the used oil became commingled with the fuel and was burned off with the fuel during engine operation.

The first such system of which applicant is aware was developed and marketed by Power Plus Corporation of San Marcos, Calif., a corporation of which applicant is currently chairman of the board of directors. This prior system of Power Plus Corporation was marketed in the 1970s, and employed a timer for periodically actuating a reciprocating metering device to extract a small increment of used oil from the crankcase of a diesel engine and direct the increment to the fuel tank for burnoff with the fuel. In this system, fresh makeup oil was incrementally pumped from a fresh oil tank by a similar reciprocating metering device which was actuated in response to low-level sensing of the crankcase oil level. The low-level sensing makeup replaced both the used oil which was periodically extracted and burned off with the fuel and crankcase oil consumed by engine operation. Thus, both automatic oil changing and automatic oil makeup were provided during engine operation by this prior Power Plus Corporation system.

Applicant is aware of three prior art patents which disclose generally similar systems for automatically changing diesel engine crankcase oil and burning off the used oil with the fuel, and for providing makeup oil by means of low crankcase oil level sensing. One of these is the Yasuhara U.S. Pat. No. 4,417,561 wherein used crankcase oil is periodically valved by an odometer switch to the fuel tank, and fresh oil is gravity fed from a fresh oil tank to the crankcase by a valve controlled by a crankcase oil level switch. The quantity of each increment of burnoff oil removed from the crankcase is controlled by a timer. The Hurner U.S. Pat. No. 4,421,078 discloses a similar system for changing and making up crankcase oil during engine operation, in which a one-way cylinder is preloaded with an increment of used crankcase oil by pressure of the oil, and is periodically emptied by air pressure operation to the fuel tank. Fresh makeup oil is driven from an oil reservoir to the crankcase, also by air pressure, in response to low level dipstick sensing. A similar system is also disclosed in the Hurner U.S. Pat. No. 4,495,909.

Applicant is aware of only one prior art patent, the Bonfilio U.S. Pat. No. 3,447,636, which discloses a system for changing engine oil while the engine is operating that employs a fresh oil-containing hydraulic cylinder actuated to eject the fresh oil by used, pressurized crankcase oil which is removed from the crankcase. In the Bonfilio system, the cylinder contains a supply of fresh oil sufficient for a complete engine oil change, and the entire supply of used crankcase oil except what may be in the oil filter and a small bleeder line actuates the cylinder and replaces the fresh oil that was in the cylinder in response to the manual closing of an electrical switch, for a one-shot complete oil change. Most of the fresh oil from the cylinder is stored in a temporary storage tank while most of the used engine oil displaces it in the cylinder for the express purpose of avoiding any substantial intermingling of spent oil and fresh oil, so that substantially all oil is removed from the crankcase during the oil changing event while the engine is running. Those skilled in the art will understand that the resulting substantially complete lack of oil in the crankcase will be likely to result in serious engine damage.

Applicant is aware of a number of other patents which disclose fresh oil makeup systems without oil changing. Thus, the Scott Pat. No. 4,299,307 discloses manual valving of makeup oil to the crankcase when low level is sensed either by a pressure sensor or by a float switch; the Zeidler et al. Pat. No. 4,105,092 discloses a dual pump system in which a relatively greater capacity pump holds crankcase oil level at its input; the Lang Pat. Nos. 4,091,894 and 4,091,895 disclose barometric-type crankcase oil makeup systems wherein fresh oil is enabled to flow in the crankcase when an air-carrying sensor tube becomes uncovered as the oil level drops; the Gulla Pat. No. 3,882,967 discloses crankcase makeup in response to temperature-sensitive resistors in the crankcase arranged to be sequentially uncovered; the Rath, Jr. Pat. No. 3,876,037 discloses crankcase oil makeup pursuant to thermistor sensing, but which does not appear to be automatic; and the Norton Pat. No. 2,836,259 discloses crankcase oil makeup by a centrifugal pump responsive to a crankcase oil level sensor which may be a float, oil pressure device or diaphragm.

Applicant is not aware of any prior art system for automatically changing crankcase oil and making up crankcase oil level while an engine is running which periodically displaces an increment of used oil from the engine lubricating oil system and simultaneously replaces the used oil with an equal increment of new oil so that crankcase oil level does not lower during the incremental oil changing events.

Applicant is also not aware of any prior art system for changing and making up crankcase oil during engine operation in which the used oil extracted from the engine lubricating oil system is selectively routed either to the fuel tank or a holding tank in an oil change mode of operation, or back to the crankcase in an oil makeup mode of operation, in response to automatic crankcase oil level sensing. Applicant further is not aware of any prior art system for changing and making up engine lubricating oil during engine operation in which hydraulic cylinder means produces displacement of both used engine lubricating oil and fresh engine lubricating oil for both the oil change mode of operation and the makeup mode of operation.

SUMMARY OF THE INVENTION

In view of these and other problems in the art, it is a general object of the present invention to provide a novel system for automatically changing crankcase oil in an internal combustion engine on a periodic basis while the engine is running which does not materially lower the crankcase oil level.

Another object of the invention is to provide a system for automatically changing engine crankcase oil while an engine is running in which a small increment of used oil is periodically removed from the engine lubrication system or circuit, and not later than the removal of each increment of used oil an increment of fresh replacement oil is added to the lubrication system or circuit which is volumetrically not substantially less than such increment of used oil, whereby the volume of oil in the oil lubricating system or circuit is not materially reduced by the removal of each of the increments of used oil.

A more specific object of the invention is to provide a system for automatically changing engine crankcase oil while an engine is running which periodically displaces a small increment of used oil from the engine lubricating system or circuit and simultaneously replaces the increment of used oil with a substantially equal small increment of new oil so that crankcase oil level does not materially become lowered at any moment during the incremental oil changing events.

Another object of the invention is to provide a system for automatically changing engine crankcase oil while the engine is running in which increments of used crankcase oil are periodically withdrawn from the engine lubricating system in a series of periodic fractional changing events, wherein fresh makeup oil is positively incrementally added to the lubricating system during each of the fractional oil changing events, rather than the fresh oil being randomly supplied an a crankcase oil level sensing basis as was done in the prior art.

A further object of the invention is to provide a system for both changing and making up engine crankcase oil during engine operation in which increments of used oil are periodically extracted from the engine lubricating oil system and simultaneously replaced by increments of fresh lubricating oil, wherein the used oil is selectively routed either to the fuel tank for diesel engines or to a holding tank for other engines in an oil change mode of operation of the system, or instead is routed back to the crankcase in an oil makeup mode of operation, such routing being in response to automatic crankcase oil level sensing.

A still further object of the invention is to provide a system for automatically changing and making up engine crankcase oil during engine operation in which hydraulic cylinder means produces displacement of both used engine lubricating oil and fresh engine lubricating oil for both the oil change mode of operation and the makeup mode of operation.

According to a presently preferred embodiment of the invention, hydraulic displacement means, which may be hydraulic cylinder means, is periodically actuated to receive a small increment of used engine lubricating oil, and while it is receiving this increment of used oil, it is simultaneously providing an equal increment of fresh lubricating oil to the crankcase such that the level of the oil in the crankcase does not materially become lowered during each of the incremental oil changing events. At the completion of each incremental oil changing event, when the hydraulic cylinder means contains a full increment of used lubricating oil and has dispensed a full increment of fresh crankcase oil into the crankcase, the hydraulic cylinder means is returned to its initial condition before the event started, which is a standby condition of the hydraulic cylinder means. During this return from its fully actuated to its initial, standby condition, the hydraulic cylinder means ejects the increment of used oil which it had just received while being actuated, and crankcase oil level sensing means, preferably of the electronic dipstick type, determines the destination of this increment of used oil. If the level sensor senses a normal crankcase oil level, then this increment of used oil is delivered from the hydraulic cylinder means to the fuel tank in the case of a diesel engine for burnoff with the diesel fuel, or to a holding tank for otherwise fueled engines. On the other hand, if the crankcase oil level sensor senses a lower than normal level, then the increment of used oil is delivered from the cylinder means back to the crankcase so that the increment of new oil which was delivered to the crankcase during actuation of the cylinder means represents makeup oil. During return of the cylinder means from its actuated condition back to its initial, standby condition, an increment of fresh oil is drawn into the cylinder means from a fresh oil tank in preparation for the next periodic incremental oil change event.

Operation of the automatic oil change and makeup system of the invention is controlled by an electronic controller, which may be a microprocessor, that is adjustable to vary the periodicity of the incremental oil change events so that a cumulative quantity of fresh oil can be provided to the crankcase according to the regular recommended oil change period for any particular engine.

The form of the invention shown and described in detail herein employs a single double-acting hydraulic cylinder having a used oil pressure end and a fresh oil pump end, with a piston that is spring biased toward the pressure end but otherwise free floating. This displacement cylinder is actuated for each periodic incremental oil changing event by the controller energizing and opening a pressure solenoid valve which directs pressurized engine lubricating oil into the pressure end of the cylinder, displacing the piston so as to fill the cylinder on the pressure side of the piston with an increment of used oil, while simultaneously pumping an increment of fresh oil from the pump side of the piston out of the cylinder and into the crankcase. A proximity sensor in the pump end of the cylinder causes the controller to deenergize and shut the pressure solenoid valve, and energize and open either a displacement solenoid valve or a return solenoid valve according to whether an electronic dipstick senses a normal crankcase oil level or a lowered crankcase oil level. If a normal oil level is sensed, then the displacement solenoid valve is energized and opened and the piston return spring in the cylinder moves the piston back to its initial, standby position, displacing the increment of used oil back out through the pressure end of the cylinder and thence through the displacement solenoid to the fuel tank for burnoff with the fuel if the engine is diesel, or to a holding tank if the engine is fueled by gasoline or hydrocarbon gas. Alternatively, if the electronic dipstick senses a lower than normal oil level, the return solenoid valve is energized and opened by the controller and the used oil is displaced through the return solenoid valve back to the crankcase so that the fresh oil increment displaced from the cylinder to the crankcase during the pressure stroke of the piston represents makeup oil. At the end of the spring-energized return stroke of the piston when it reaches its initial standby position, a second proximity sensor, in the pressure end of the cylinder, is energized, causing the controller to deenergize and close whichever of the displacement or return solenoid valves had been open, placing the system on standby awaiting the next periodic incremental oil change event.

The controller has an electronic dipstick readout, LED indicator lights which indicate which of the solenoid valves are actuated, a readout window which in one mode indicates gallons of fresh oil that have been cumulatively delivered to the crankcase since an initial setting of the controller, and another mode in which it displays the amount of oil consumed from the crankcase by engine operation. An LED malfunction light is also provided on the controller which will illuminate if a malfunction should occur in the system, and an accompanying audible alarm may be provided.

BRIEF DESCRIPTION OF THE DRAWINGS

FIG. 1 is a perspective view illustrating portions of both the hydraulic circuitry and the electrical circuitry employed in the invention;

FIG. 2 is a diagrammatic view illustrating the hydraulic and electrical circuitry of the invention, including the microprocessor controller, fresh oil tank, fuel tank, crankcase or oil sump, pressurized oil gallery, and the electronic dipstick;

FIG. 3 is a fragmentary diagrammatic view taken from FIG. 2 with arrows indicating both the pressure stroke and the return stroke of the cylinder in the makeup mode of operation of the system;

FIG. 4 is a view similar to FIG. 3, but with arrows indicating the oil change mode of operation of the system;

FIG. 5 is an axial, vertical section taken on the line 5-5 in FIG. 1 showing details of construction of the hydraulic cylinder displacement unit of the invention, with the piston shown in its unactuated, standby position proximate the pressure end of the cylinder.

DETAILED DESCRIPTION

Figure 6:
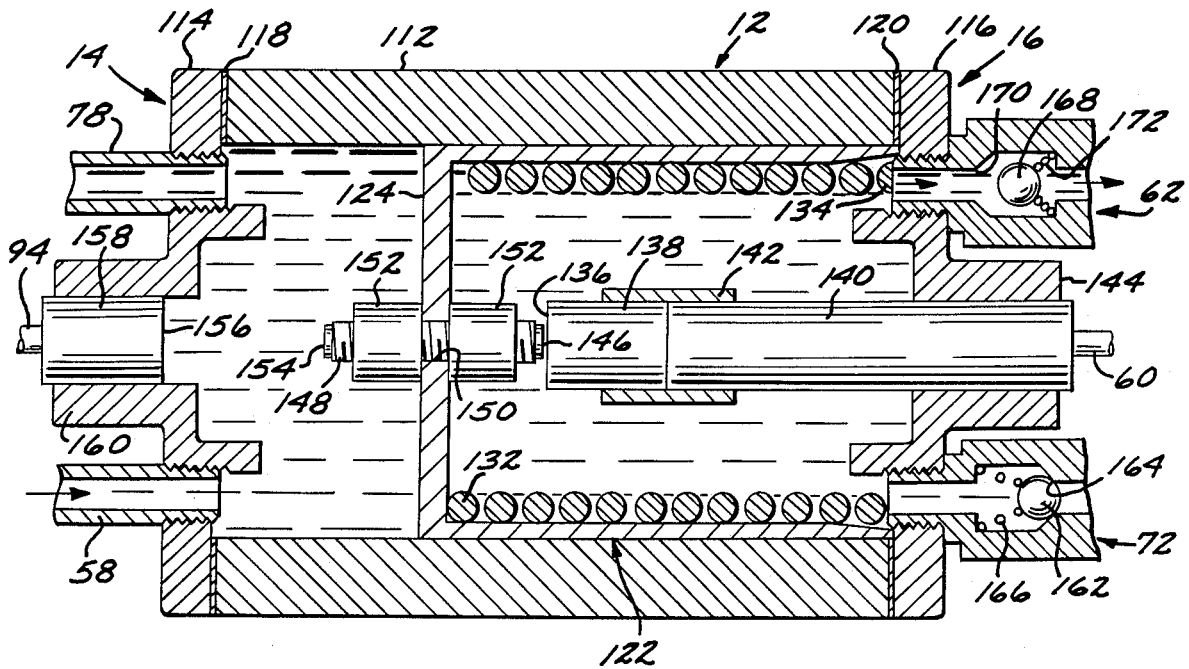
FIG. 6 is a view similar to FIG. 5, but with the piston shown in its fully actuated position proximate the fresh oil pump end of the cylinder at the completion of a pressure stroke.

Referring to the drawings, and at first particularly to FIGS. 1 and 2 thereof, these figures illustrate both hydraulic circuitry and electrical circuitry employed in a presently preferred embodiment of the invention. FIG. 1 is a perspective view illustrating primarily the hydraulic circuitry and components, and also electrical connections thereto, which are mounted on a base or platform 10. FIG. 2 is entirely diagrammatic.

At the heart of the present invention is a displacement unit generally designated 12, which, in the form of the invention illustrated in the drawings, is hydraulic cylinder means in the form of a double-acting hydraulic cylinder. Inside the hydraulic cylinder 12 is a piston which is spring-biased toward one end of cylinder 12, but which is otherwise free-floating. The inside of displacement unit cylinder 12 is utilized on both sides of the piston. Thus, displacement unit 12 has a pressure end 14 through which used crankcase oil enters the cylinder on one side of the piston during a pressure stroke and is ejected from the cylinder during a spring-energized return stroke; and a fresh oil pump end 16 through which new, fresh oil is ejected from the other side of the piston during the pressure stroke and is drawn into the cylinder during the return stroke. The internal details of construction of displacement unit 12 are described in connection with FIGS. 5 and 6 of the drawings.

An electronic controller 18, which may be a microprocessor, shown in FIG. 2 times and controls the operation of the automatic crankcase oil change and makeup system of the invention, as well as indicating the status of solenoid actuated valves, engine operating time, quantity of fresh oil delivered to the crankcase, and malfunction warning.

Referring now to FIG. 2, a pressurized oil gallery 20 receives used engine oil from oil sump or crankcase 21 through a pickup conduit 22, oil gallery 20 being pressurized by a pump 23. An electronic dipstick generally designated 24 has a probe 25 terminating at a lower end 26 which is normally immersed in the body 27 of crankcase oil below the surface level 28. Electronic dipstick 24 is electrically connected to controller 18 through a cable 30. If the level 28 of crankcase oil 27 should fall below the tip 26 of electronic dipstick 24, then dipstick 24 communicates a suitable signal to controller 18. If desired, dipstick probe 25 may be disposed in an antechamber 31 offset from the primary chamber of oil sump or crankcase 21, and a baffle 32 may be employed to partially isolate antechamber 31 from crankcase oil surges caused by vehicle motion. Suitable electronic dipsticks are obtainable from Power Plus Corporation of San Marcos, Calif.

Vehicle fuel tank 32 is also illustrated in FIG. 2 because used crankcase oil is delivered to it for burnoff with the fuel if the engine with which the invention is operatively associated is a diesel engine. If the engine is gasoline or hydrocarbon gas operated, then the used crankcase oil will not be delivered to the fuel tank, but instead to a holding tank (not shown). A fresh oil supply tank 34 is also shown in FIG. 2, for supplying fresh oil first to the fresh oil pump end 16 of displacement unit 12, and thence to oil sump 21. An electrical connection box 36 is shown in both FIGS. 1 and 2, and has a power supply input cable 38 which preferably supplies DC electrical power, which, for example, may be at approximately 24 volts for energization of the solenoid valves of the system.

The pressure oil hydraulic and electrical circuits will now be described. The pressure oil is used crankcase oil, and it is supplied from pressurized oil gallery 20 through conduit 40 to the inlet fitting 42 of a distribution block 44. A pressure switch 46 is hydraulically connected to distribution block 44, and has an electrical connection 48 through connection box 36 to controller 18. Pressure switch 46 is open and the system of the invention is inoperative when the engine is not running. When the engine commences running, pressurization of oil gallery 20 by pump 23 provides pressurized oil through conduit 40 to distribution block 44, thereby pressurizing the pressure switch 46, which in turn sends an electrical signal through connection 48 to controller 18 which actuates controller 18 and renders the system of the invention operative.

Pressure oil is conducted from distribution block 44 through an oil pressure hose 50 to the input side of a pressure solenoid valve 52. Solenoid valve 52 is a normally closed valve which is energizable to the open position by electric current provided through an electrical connection 54 which extends from solenoid valve 52 through connection box 36 to controller 18. When pressure solenoid valve 52 is energized to its open position, then pressure oil is conducted from its output through a pressure hose 56 to an inlet fitting 58 on the pressure end 14 of displacement unit 12. Pressure fluid thus introduced into the cylinder of displacement unit 12 through pressure end 14 causes the internal piston to move toward the fresh oil pump end 16 of the cylinder until the piston reaches a stop, at which point a pressure stroke sensor within the cylinder sends an electrical signal through a pressure stroke sensor cable 60 through connection box 36 to controller 18. In response, the controller deenergizes pressure solenoid valve 52 which closes valve 52 and thereby shuts off the flow of pressure oil through pressure hose 56 to displacement unit 12.

During the pressure stroke of the piston in the direction from pressure end 14 toward oil pump end 16 of displacement unit 12, fresh oil which had previously been drawn into displacement unit 12 is expelled out of the fresh oil pump end 16 through an outlet check valve fitting 62 to a return "T" fitting 64 having an outlet 66, and thence through a crankcase feed conduit 68 to oil sump or crankcase 21. An important aspect of the present invention is that during the pressure stroke of the piston in displacement unit 12, the used pressure oil which is being extracted from oil gallery 20, and hence crankcase 21, to actuate displacement unit 12 is being simultaneously replaced by fresh oil which is being pumped from displacement unit 12 through feed conduit 68 into crankcase 21. This fresh oil is displaced to crankcase 21 at the same flow rate as the used oil is extracted from oil gallery 20, and the increment of fresh oil displaced to crankcase 21 is volumetrically the same as the increment of used oil extracted from oil gallery 20. This avoids any lowering of the surface level 28 of the oil 27 in the crankcase during actuation of displacement unit 12, even momentary lowering, thereby avoiding any possibility of damage to engine parts due to a lowered oil level in the crankcase.

At the completion of the pressure stroke, a piston return spring within displacement unit 12 moves the piston back in the direction from fresh oil pump end 16 to pressure end 14, drawing fresh oil from reservoir 34 through a supply conduit 70 into the fresh oil pump end 16 of displacement unit 12 through an inlet check valve fitting 72. The fresh oil which had been pumped as described above into crankcase 21 during the pressure stroke is thus replenished within displacement unit 12.

During the return stroke of the piston within displacement unit 12 under the influence of the piston return spring, the piston ejects the used, no longer pressurized oil from displacement unit 12 through its pressure end 14. If a precalibrated level on electronic dipstick 24 is immersed in crankcase oil, indicating a proper working level of the crankcase oil, then controller 18 directs this used oil to fuel tank 32 for burnoff with the fuel (or alternatively to a holding tank) as part of the oil change mode of operation of the invention. If, on the other hand, the level 28 of crankcase oil 27 is below the precalibrated level of electronic dipstick 24, then controller 18 directs the used oil from displacement unit 12 back to crankcase 21 for the makeup mode of operation of the invention. Directing of this used oil from displacement unit 12 to fuel tank 32 for the burnoff (or to a holding tank) in the oil change mode is accomplished by opening a normally closed displacement solenoid valve 74, while directing this used oil from displacement unit 12 back to the crankcase for the makeup mode is accomplished by opening a normally closed solenoid valve 76.

During the spring-biased return stroke of the piston in displacement unit 12, the used oil flows out through a return fitting 78 and a return hose 80 to a "T" fitting 82 which is and return solenoid valve 76. Displacement solenoid valve 74 has an outlet fitting 84 connected to a conduit 86 which leads to fuel tank 32. Electrical connection 88 leads from displacement solenoid valve 74 through electrical connection box 36 to controller 18. When controller 18 energizes displacement solenoid valve 74 through electrical connection 88, the used oil ejected from displacement unit 12 during the return piston stroke will flow through return fitting 78, return hose 80, "T" fitting 82, displacement solenoid valve 74 and its outlet fitting 84, and thence through conduit 86 to fuel tank 32 (or a holding tank) in the oil change mode of operation of the invention. During this time, return solenoid valve 76 remains closed.

The outlet of return solenoid valve 76 is connected through a return hose 90 to "T" fitting 64, which in turn is connected through its outlet 66 and feed conduit 68 to crankcase 21. Electrical connection between controller 18 and return solenoid valve 76 is provided by electrical connection 92 which extends through connection box 36. When controller 18 holds return solenoid valve 76 in its energized, open position through electrical connection 92 during the return stroke of the piston in displacement unit 12, used oil flows out of pressure end 14 through return fitting 78, through return hose 80, "T" fitting 82, return solenoid valve 76, return hose 90, and then through "T" fitting 64 and feed conduit 68 to crankcase 21, for the makeup made of operation of the invention During this time, displacement solenoid valve 74 will be closed. This return of an increment of used oil from displacement unit 12 back to crankcase 21 in addition to the increment of fresh oil added to crankcase 21 during the pressure stroke provides a net increase of one displacement increment of oil from displacement unit 12 to crankcase 21.

The volume of fresh oil pumped to crankcase 21 by each pressure stroke of displacement unit 12 will be an identical, predetermined increment of fresh oil controlled by the piston displacement within displacement unit 12. Although any desired incremental volume may be employed, increments of approximately 80th of a gallon (1/20th of a quart) determined by the displacement of the piston within displacement unit 12 have proven satisfactory in experimental apparatus according to the invention. The frequency of the pressure strokes is set by the timer in the controller, and is adjustably set to a fixed periodicity that will provide a cumulative quantity of fresh oil to the crankcase according to the regular recommended oil change period for the particular engine. A pair of dials 95 on the controller enable the repeat frequency of the pressure strokes of displacement unit 12 to be adjusted according to tenths of gallons per hour and hundredths of gallons per hour of fresh oil to be delivered from displacement unit 12 to crankcase 21.

At the end of each pressure stroke of displacement unit 12, a pressure stroke sensor in the fresh oil pump end 16 sends a signal to controller 18, and in response to this signal the controller deenergizes pressure solenoid valve 52 to close it, and energizes one of the two solenoid valves 74 or 76 depending upon whether used oil is to be directed to fuel tank 32 (or a holding tank) by displacement solenoid 74 in the normal oil change mode, or whether used oil is to be directed back to crankcase 21 through return solenoic valve 76 in the makeup mode. Opening of either of the solenoid valves 74 or 76 relieves oil pressure on the pressure side of the piston in displacement unit 12, enabling the return spring to drive the piston in the direction from fresh oil pump end 16 toward pressure end 14 so as to drive the used oil out of displacement unit 12 and through return fitting 78, return hose 80, "T" fitting 82, and thence through the open one of solenoid valves 74 or 76 to be routed either to fuel tank 32 (or a holding tank) or back to crankcase 21. Upon completion of the return stroke of the piston, a return stroke sensor in the pressure end 14 sends a signal to controller 18, causing controller 18 to deenergize the solenoid valve 74 or 76 that was open, leaving all three of the solenoid valves 52, 74, and 76 closed. The hydraulic circuit is then on standby until the next periodic actuation of displacement unit 12 by controller 18, which is initiated by energization and opening of pressure valve 52. Such initiation of a new periodic actuation of displacement unit 12 will only occur if the engine is running and thereby pressurizing the pressure switch 46 which signals controller 18 to continue with the periodic actuations of displacement unit 12 and consequent periodic injection of increments of fresh oil into crankcase 21.

While power supply cable 38 is shown broken away in FIG. 2 as it enters connection box 36, it is to be understood that through the box 36 it connects with and supplies the necessary energization electrical power to pressure switch 46 and to the three solenoid valves 52, 74 and 76.

Referring to FIG. 2, electronic dipstick 24 has a readout scale 96 on controller 18. This is a linear readout which indicates the level 28 of oil in crankcase 21, as well as indicating when the oil level 28 drops below the aforesaid precalibrated level on electronic dipstick 24. Electronic dipstick 24 operates on a variable capacitance basis. Probe 25 has a conductive outer shell with a center electrode therein which is electrically isolated from the outer shell and extends down to the tip 26. The capacitance of probe 25 varies linearly with the level of oil between the outer tube and the center electrode because of varying dialectric effect with an increased length of oil in probe 25. This variable capacitance of probe 25 is part of a resonant circuit in electronic dipstick 24 in which the resonant frequency varies according to such variable capacitance. The variable resonant frequency is then translated electronically in controller 18 to provide the variable dipstick readout 96 on controller 18.

Three LED status lights 98, 100 and 102 on controller 18 indicate the status of respective solenoid valves 52, 76 and 74. Illumination of each of these status lights 98, 100 and 102 indicates energization and hence open status of its respective solenoid valve 52, 76 or 74.

A readout window 104 on controller 18 has two modes. In one mode, it indicates gallons of fresh oil which have been cumulatively delivered to the crankcase since an initial setting of controller 18. This figure is computed in controller 18 according to the displacement volume of displacement unit 12 and the number of pressure strokes which have occurred since the initial setting. When readout window 104 is in this first mode, LED status light 106 is illuminated In its second mode, readout window 104 displays the amount of oil which has been consumed from the crankcase by engine operation. This is computed by controller 18 according to the displacement volume of displacement unit 12 and the number of energizations of return solenoid valve 76 during which fresh oil has been added by the pressure stroke of displacement unit 12 without permanently diverting any of the used oil from crankcase 21 through displacement solenoid 74 to fuel tank 32 or to a holding tank.

An LED malfunction light 110 is also provided on controller 18. The microprocessor in controller 18 monitors the amount of time it takes each of the solenoid valves 52, 74 and 76 to complete each of its cycles of operation, and also monitors the amount of time it takes for the pressure stroke and the return stroke to occur as indicated by the timing differential between solenoid valve operations and energization of the sensors in the fresh oil pump end 16 and pressure end 14 of displacement unit 12. If the cycle of operation of any of the solenoid valves 52, 74 and 76, or either the pressure stroke or the return stroke of displacement unit 12, should be substantially longer than a normal operational time, then LED malfunction light 110 will illuminate and the system will be automatically shut down by controller 18 to avoid any possible damage to the engine from an overly low or an overly high level 28 of oil in crankcase 21, and to avoid any possible damage to the system of the invention. Typical malfunctions would be partial or complete plugging of a hydraulic hose or fitting or solenoid valve port, or failure of one of the solenoid valves to function. An audible alarm may be provided to accompany LED malfunction light 110.

FIG. 3 diagrammatically illustrates a single actuation of the system of the invention, including both the pressure stroke and the return stroke, in the makeup mode of operation of the system. Directional arrows indicate liquid flow for both the pressure stroke and the return stroke. In the pressure stroke, used crankcase oil flows from oil gallery 20 through conduit 40, distribution block 44, oil pressure hose 50, energized and open pressure solenoid valve 52, and pressure hose 56 into the pressure end 14 of displacement unit 12 so as to load the pressure side of the displacement piston with an increment of used crankcase oil, and eject an increment of fresh oil from the pump end 16. This represents the pressure stroke of the system, and during this stroke fresh oil will leave the fresh oil pump end 16 of displacement unit 12 through check valve 62, return "T" fitting 64, and through feed conduit 68 to crankcase 21.

At the completion of the pressure stroke, as indexed by the pressure stroke sensor in the fresh oil pump end 16, pressure solenoid valve 52 closes and return solenoid valve 76 opens, whereupon the return spring moves the piston in displacement unit in the direction from fresh oil pump end 16 toward pressure end 14, drawing fresh oil into displacement unit 12 through fresh oil pump end 16 from the fresh oil tank 34 through fresh oil supply conduit 70 and inlet check valve fitting 72, so as to load an increment of fresh oil into displacement unit 12 on the fresh oil side of the piston. Simultaneously with such input of fresh oil to the displacement unit 12, the piston is ejecting the used oil which actuated displacement unit 12 during the pressure stroke from the pressure end 14 of displacement unit 12 out through return hose 80, "T" fitting 82, energized and open return solenoid valve 76, return hose 90, return "T" fitting 64, and return conduit 68 to crankcase 21. Thus, all of the used oil which had been employed to actuate displacement unit 12 during the pressure stroke is returned to crankcase 21, and an increment of fresh oil has also been added to crankcase 21, to provide a makeup increment of oil to the crankcase. This full makeup cycle of operation of displacement unit 12 is terminated upon completion of the return stroke of the piston by the return stroke sensor in the pressure end 14 signalling controller 18 which deenergizes and closes return solenoid valve 76 to put the system back on standby mode awaiting another timed actuation signal from controller 18.

FIG. 4 illustrates the oil change mode of operation of the invention, which is the usual mode of operation since the makeup mode just described is the exception, particularly for engines which are in good condition. During the pressure stroke, pressure solenoid valve 52 is opened just the same as it was during the makeup mode described above, permitting pressurized crankcase oil to flow from oil gallery 20 through conduit 40 to distribution block 44, and thence t rough pressure hose 50, energized and open pressure solenoid valve 52, pressure hose 56, and through pressure end 14 into displacement unit 12 on the pressure side of the piston. The used pressure oil then loads the pressure side of the piston with an increment of the used oil, while simultaneously moving the piston to eject an increment of preloaded fresh oil from the fresh oil pump end 16 of displacement unit 12 out through outlet check valve fitting 62, return "T" fitting 64, and thence through return conduit 68 to crankcase 21. As each fraction of the increment of used oil which loads the pressure side of the piston is removed from the used oil side of the system, an equal fraction of the preloaded increment of fresh oil is moved back into the crankcase, so that the crankcase oil level 28 remains unaltered during the pressure stroke of displacement unit 12.

The pressure stroke sensor in the fresh oil pump end 16 signals controller 18 at the end of the pressure stroke to cause controller 18 to deenergize and shut pressure solenoid valve 52, and energize and open displacement solenoid valve 74, whereby during the return stroke of the piston in displacement unit 12 in the direction from fresh oil pump and 16 toward pressure end 14, used oil will be ejected through pressure end 14, return hose 80, "T" fitting 82, displacement solenoid valve 74, and conduit 86 to fuel tank 32 for commingling with fuel in tank 32 and consequent burnoff of this used crankcase oil (or alternatively to a holding tank).

The makeup mode of operation described above in connection with FIG. 3 and the oil change mode of operation described above in connection with FIG. 4 are both dependent upon the pressure switch 46 being in its actuated condition in response to the engine being in its operative state so as to provide oil pressure from oil gallery 20 through conduit 40 and distribution block 44 to pressure switch 46.

FIGS. 5 and 6 illustrate the construction and operation of displacement unit 12, with the piston shown in FIG. 5 in its unactuated, standby position proximate the pressure end 14 with the piston return spring in its fully extended condition; while in FIG. 6 the piston is shown in the fully actuated position proximate the fresh oil pump end 16 at the completion of a pressure stroke, with the spring in its fully compressed condition.

The structural basis for displacement unit 12 is a cylindrical body 112, which is a right circular cylinder, having a pair of end caps 114 and 116 respectively at the pressure end 14 and the fresh oil pump end 16 of displacement unit 12. Sealing gaskets 118 and 120 are interposed between the respective end caps 114 and 116 and the ends of cylindrical body 112. Pressure fitting 58 and return fitting 78 provide fluid communication through end cap 114 to the inside of pressure end 14. Inlet check valve fitting 62 and outlet check valve fitting 72 provide fluid communication through end cap 116 to the inside of the fresh oil pump end 16.

The piston is generally designated 122, and includes a generally flat head 124, and an elongated cylindrical sleeve 126 with a tapered skirt edge 128, the tapered edge 128 assuring against the piston sleeve hanging up on coils of the spring. Piston 122 is axially slideable in cylindrical body 112 with a fluid-tight seal. Piston return string 130 is a helical compression spring which fits inside piston sleeve 126, having ends 132 and 134 which bear against the inside of piston head 124 and the end cap 116, respectively.

The pressure stroke sensor 136 is disposed inside cylinder body 112 within piston sleeve 126, and is supported by the end cap 116 at the fresh oil pump end 16. Pressure stroke sensor 136 is of the magnetic proximity type, and is located within an aluminum housing 138 which is supported on the inner end of a support rod 140 by means of a collar 142. Support rod 140 is secured within a support head 144 which is threadedly mounted in end cap 116. The pressure stroke sensor cable 60 extends through support rod 140 and outwardly from the outer end of support rod 140. A pressure stroke magnet 146 is centrally mounted on piston head 124 within piston sleeve 126. At the completion of the pressure stroke as illustrated in FIG. 6, the pressure stroke magnet 146 comes close to and actuates the pressure stroke sensor 136.

Pressure stroke magnet 146 is mounted in the inner end of an externally threaded magnet support rod 148 which extends through a central hole 150 is piston head 124. A pair of internally threaded collars 152, which may be nuts, are threadedly engaged over the magnet support rod 148 and clamp against opposite sides of piston head 124 to secure magnet support rod 148 in its central, axially oriented position extending through piston head 124.

A return stroke magnet 154 is supported by magnet support rod 148 on the outside of piston head 124, i.e., at the opposite end of rod 148 from pressure stroke magnet 146. Return stroke sensor 156 has an aluminum housing 158 which is supported in a support head 160 which is threadedly mounted in end cap 114. The return stroke cable 94 projects outwardly from return stroke sensor housing 158.

Looking at the pressure end 14 of displacement unit 12, pressure oil inlet fitting 58 and outlet fitting 78 are open, unchecked conduits, which is enabled because pressure oil input flow through inlet fitting 58 is controlled by pressure solenoid valve 52 and output return oil flow through return fitting 78 is controlled by either displacement solenoid valve 74 or return solenoid valve 76. Inlet fitting 58 is preferably proximate the bottom of cylinder 112, and return fitting 78 is preferably proximate the top of cylinder 112.

Looking at the fresh oil pump end 16 of displacement unit 12, inlet check valve fitting 72 is preferably located proximate the bottom of cylinder 112 and outlet check valve fitting 62 is preferably located proximate the top of cylinder 112. Inlet check valve fitting 72 is a normally closed check valve, having a ball poppet 162 which is normally seated against a valve seat 164 by a coil spring 166. Outlet check valve fitting 62 is also a normally closed check valve, having an outlet ball poppet 168 which is normally seated on valve seat 170 by means of a coil spring 172.

Displacement unit 12 will normally be in its unactuated, standby condition as illustrated in FIG. 5. Actuation of displacement unit 12 is initiated by energization and opening of pressure solenoid valve 52 to supply used pressure oil through pressure hose 56 and inlet fitting 58 to the inside of cylinder 112 above piston head 124 or to the left as viewed in FIGS. 5 and 6. Pressure solenoid valve 52 will remain open, filling the pressure end of cylinder 112 until the piston 122 reaches the end of the pressure stroke as illustrated in FIG. 6, at which time pressure stroke proximity sensor 136 senses pressure stroke magnet 146 and controller 18 deenergizes and closes pressure solenoid valve 52, and also energizes and opens either displacement solenoid valve 74 or return solenoid valve 76. The amount of oil within cylinder 112 above or to the left of piston head 124 seen in FIG. 6 represents one displacement increment of used oil.

During the compression stroke from the piston position of FIG. 5 to the piston position of FIG. 6, an equal displacement increment of fresh oil is displaced out of the fresh oil pump end 16 of displacement unit 12 through outlet check valve fitting 62, with the outlet ball poppet 172 unseated as shown in FIG. 6, and the inlet ball poppet 162 of inlet check valve fitting 72 remaining seated. As the pressure stroke proceeds from the position of FIG. 5 to the position of FIG. 6, for each amount of pressure oil which enters the pressure end 14 of cylinder 112, an equal amount of fresh oil will be pumped out of the fresh oil pump end 16 of cylinder 112 through outlet check valve fitting 62. Since this fresh oil is pumped into crankcase 21, and the pressure oil is obtained from oil gallery 20, and hence from crankcase 21, any lowering of the crankcase oil level 28 is completely avoided at any time during the pressure stroke. The exchange of fresh oil for used pressure oil is exactly equal at all points during the pressure stroke.

The return stroke of piston 122 under the influence of spring 130 is enabled when pressure is relieved from the pressure side of piston head 124, i.e., the left side as viewed in FIG. 6, upon energization and opening of either displacement solenoid valve 74 or return solenoid valve 76. The return stroke of piston 122 is represented by the amount of movement from its position in FIG. 6 to its position in FIG. 5. During the return stroke fresh oil is drawn into the fresh oil side of piston head 124, which is the right-hand side as viewed in FIGS. 5 and 6, through inlet check valve fitting 72, the ball poppet 162 unseating off of seat 164, while the outlet check valve fitting 62 remains closed. During the return stroke of piston 122, an identical increment of fresh oil is drawn into cylinder 112 through fresh oil pump end 116 as was pumped out of the fresh oil pump end 16 during the pressure stroke described above. Similarly, the identical increment of used pressure oil which entered cylinder 112 through the pressure end 14 during the pressure stroke is ejected from the pressure end 14 during the return stroke, normally being routed to fuel tank 32 (or to a holding tank) through displacement solenoid valve 74 in the oil change mode; but when makeup oil is required, being routed through return solenoid valve 76 back to crankcase 21, so that the increment of fresh oil that was pumped out through the fresh oil pump end 16 and routed to crankcase 21 during the pressure stroke constitutes makeup oil, i.e., an increment of fresh oil added to the crankcase in addition to the amount of oil which was already in the crankcase at the start of the cycle of operation of displacement unit 12.

Although the present invention has been illustrated and described in detail herein with reference to a displacement unit which employs hydraulic cylinder means in the form of a single double-acting hydraulic cylinder, it is to be understood that other hydraulic displacement means may be employed within the scope of the invention for periodically withdrawing an increment of used crankcase oil from the engine lubricating system or circuit and pumping an identical increment of fresh oil into the crankcase, and then either direction the increment of used oil to a diesel fuel tank for burnoff with the fuel or to a holding tank for otherwise-fueled engines in an oil change mode of operation, or directing the increment of used oil back to the crankcase in the makeup mode of operation.

While it is presently preferred to simultaneously deliver each increment of fresh oil to the engine lubrication system or circuit while the corresponding increment of used oil is being extracted from the lubrication system or circuit, it is to be understood that each increment of fresh oil may alternatively be delivered to the lubrication system or circuit either entirely or partially ahead of the extraction of the corresponding increment of used oil from the lubrication system or circuit within the scope of the invention, since the volume of oil in the lubricating system or circuit would not be reduced by such sequential or partially sequential adding of fresh oil increments and removing of used oil increments.

While the present invention has been described with reference to a presently preferred embodiment, it is to be understood that various modifications or alterations made be made by those skilled in the art without departing from the scope and spirit of the invention as set forth in the appended claims.

I claim:

1. The method of changing oil in the lubricating oil system of an internal combustion engine while the engine is running, the oil in at least a portion of said system being pressurized, which comprises the steps of:
    periodically removing a series of small increments of used lubricating oil from said system;
    not later than said removing of each of said increments of used oil, delivering a small increment of fresh lubricating oil into said system which is volumetrically not substantially less than such increment of used oil; and
    utilizing force from such pressurization to cause said periodic removing of said increments of used oil from said system;
    whereby the volume of oil in said system is not materially reduced by said removing of each of said increments of used oil.

2. The method of claim 1, which comprises utilizing force from such pressurization to cause said delivering of said increments of fresh oil into said system.

3. The method of changing oil in the lubricating oil system of an internal combustion engine while the engine is running, which comprises the steps of:
    periodically removing a series of small increments of used lubricating oil from said system, and
    not later than said removing of each of said increments of used oil, delivering a small increment of fresh lubricating oil into said system which is volumetrically not substantially less than such increment of used oil;
    each of said increments of used oil being received in displacement means while it is being removed from said system and the corresponding said increment of fresh oil being substantially simultaneously delivered from said displacement means into said system;

whereby the volume of oil in said system is not materially reduced by said removing of each of said increments of used oil.

4. The method of claim 3, wherein said displacement means comprises hydraulic cylinder means.

5. The method of claim 3, wherein the oil in at least a portion of said system is pressurized, and which comprises utilizing force from such pressurization to drive each of said increments of used oil into said displacement means and to also simultaneously deliver the corresponding said increment of fresh oil from said displacement means into said system.

6. The method of claim 7, wherein said displacement means comprises double-acting hydraulic cylinder means.

7. The method of claim 3, wherein after each of said increments of used oil has been received in said displacement means and the corresponding said increment of fresh oil has been substantially simultaneously delivered from said displacement means into said system, then such increment of used oil is delivered from said displacement means to receptacle means, and a new said increment of fresh oil is stored in said displacement means for later delivery into said system.

8. The method of claim 7, wherein said receptacle means comprises fuel tank means for said engine where said engine is a diesel engine, whereby said increments of used oil will be burned off with the fuel.

9. The method of claim 7 wherein said receptacle means comprises holding tank means, whereby said increments of used oil will be stored for later disposal.

10. The method of changing oil in the lubricating oil system of an internal combustion engine while the engine is running, said lubricating oil system comprising oil sump means containing a portion of the lubricating oil in said system, which comprises the steps of:

periodically removing a series of small increments of used lubricating oil from said system, and not later than said removing of each of said increments of used oil, delivering a small increment of fresh lubricating oil into said system which is volumetrically not substantially less than such increment of used oil;

whereby the volume of oil in said system is not materially reduced by said removing of each of said increments of used oil;

said method comprising the further steps of:

sensing the level of oil in said sump at least each time a said successive increment of used oil is removed from said system;

if the oil level so sensed is not substantially below a predetermined satisfactory operating level when a said successive increment of used oil is removed, then delivering that removed increment of used oil to receptacle means;

but if the oil level so sensed is substantially below said predetermined level when that increment of used oil is removed, then delivering that removed increment of used oil to said system, whereby the corresponding increment of fresh oil that is delivered to said system constitutes makeup oil.

11. The method of claim 10, wherein said receptacle means comprises fuel tank means for said engine where said engine is a diesel engine, whereby such removed increment of used oil will be burned off with the fuel if it is delivered to said receptacle means.

12. The method of claim 10, wherein said receptacle means comprises holding tank means, whereby such removed increment of used oil will be stored for later disposal if it is delivered to said receptacle means.

13. The method of claim 10, wherein said delivery of each of said increments of fresh lubricating oil occurs substantially simultaneously with said removing of each corresponding said increment of used lubricating oil.

14. The method of claim 10, wherein each of said increments of used oil is volumetrically substantially the same as the other said increments of used oil.

15. The method of claim 10, wherein each of said increments of fresh oil is volumetrically substantially the same as the other said increments of fresh oil.

16. The method of claim 10, wherein each of said increments of fresh lubricating oil is volumetrically substantially equal to each corresponding said increment of used lubricating oil.

17. The method of claim 16, wherein said delivering of each of said increments of fresh lubricating oil occurs at substantially the same rate as said removing of each corresponding said increment of used lubricating oil.

18. The method of claim 17, wherein each of said increments of fresh oil is volumetrically substantially the same as each of said increments of used oil.

19. A system for changing oil in the lubricating oil circuit of an internal combustion engine while the engine is running, which comprises:

a source of fresh lubricating oil, used oil displacement means having an input connected to said circuit and an output, said used oil displacement means being operable to periodically remove a series of small increments of used lubricating oil from said circuit, and fresh oil displacement means having an input connected to said fresh oil source and an output connected to said circuit and being operable to periodically deliver a series of small increments of fresh oil to said circuit at substantially the same periodicity as said used oil displacement means removes used oil increments from said circuit, each said fresh oil increment being volumetrically not substantially less than a corresponding said used oil increment and being delivered to said circuit not later than said removal of such corresponding used oil increment, whereby the volume of oil in said circuit is not materially reduced by said removing of each of said used oil increments, said used oil displacement means and said fresh oil displacement means comprising hydraulic cylinder means having used oil chamber means therein which defines a said used oil increment and having fresh oil chamber means therein which defines a said fresh oil increment, said used oil input and output communicating with said used oil chamber means, and said fresh oil input and output communicating with said fresh oil chamber means.

20. The system of claim 19, wherein said hydraulic cylinder means has a first phase of actuation during which a said increment of used oil removed from said circuit fills said used oil chamber means and a said increment of fresh oil is delivered to said circuit from said fresh oil chamber means, and a second phase of actuation during which such increment of used oil is ejected from said used oil chamber means and a new increment of fresh oil is received in said fresh oil chamber means.

21. The system of claim 20, wherein the oil in at least a portion of said circuit is pressurized, and
    a fluid connection from said pressurized circuit portion to said hydraulic cylinder means, force forms said pressurized oil operating said first phase of actuation of said hydraulic cylinder means.

22. The system of claim 21, which further comprises spring means operatively associated with said hydraulic cylinder means, said spring means being loaded by force from said pressurized oil during said first phase of actuation, and said spring means providing force for operating said second phase of actuation of said hydraulic cylinder means.

23. The system of claim 22, wherein said hydraulic cylinder means comprises a single double-acting hydraulic cylinder having piston means slideable therein,
    said cylinder having a pressure end portion and a pump end portion,
    said used oil input and output being in said pressure end portion and said used oil chamber means being defined within said cylinder on the pressure end side of said piston means,
    said fresh oil input and output being in said pump end portion and fresh oil chamber means being defined within said cylinder on the pump end side of said piston means,
    said fluid connection being to said used oil input to supply pressurized used oil to said used oil chamber to fill said used oil chamber and move said piston means toward said pump end portion in said first phase of actuation, and
    said spring means being within said cylinder on the pump end side of said piston means and being adapted to move said piston toward said pressure end portion in said second phase of actuation.

24. The system of claim 20, wherein the oil in at least a portion of said circuit is pressurized,
    first fluid conduit means from said pressurized circuit portion through said used oil input to said used oil chamber means, and
    normally closed first valve means in said conduit means which opens during said first phase of actuation.

25. The system of claim which further comprises receptacle means,
    normally closed second and third valve means,
    second fluid conduit means from said used oil chamber means through said used oil output to both of said second and third valve means,
    third fluid conduit means from said second valve means to said receptacle means,
    fourth fluid conduit means from said third valve means to said circuit,
    opening of said second valve means during said second phase of actuation causing such increment of used oil to be delivered through said second and third conduit means to said receptacle means, and
    alternative opening of said third valve means during said second phase of actuation causing such increment of used oil to be delivered through said second and fourth conduit means back into said circuit.

26. The system of claim 25, wherein said circuit comprises oil sump means containing a portion of the lubricating oil in said circuit, and which further comprises oil level sensing means in said sump means,
    said level sensing means being operatively connected to said second and third valve means so that if the oil level is not substantially below a predetermined satisfactory operating level said second valve will be opened during said second phase of actuation for delivery of such increment of used oil to said receptacle, but if the oil level is substantially below said predetermined operating level said third valve will be opened during said second phase of actuation for delivery of such increment of used oil back into said circuit.

27. The system of claim 26, wherein said level sensing means comprises electronic dipstick means.

28. The system of claim 27, wherein electronic controller means is operatively connected to said first, second and third valve means and to said electronic dipstick means for controlling the actuation and timing of said first, second and third valve means.

29. The system of claim 28, which further comprises:
    first sensing means associated with said hydraulic cylinder means and connected to said microprocessor means for determining the completion of said first phase of actuation, and
    second sensing means associated with said hydraulic cylinder means and connected to said electronic controller means for determining the completion of said second phase of actuation.

30. The system of claim 29, wherein each of said sensing means comprises a proximity sensor.

* * * * *